Dec. 3, 1935. J. W. TATTER 2,022,794
BRAKE
Filed Aug. 13, 1930
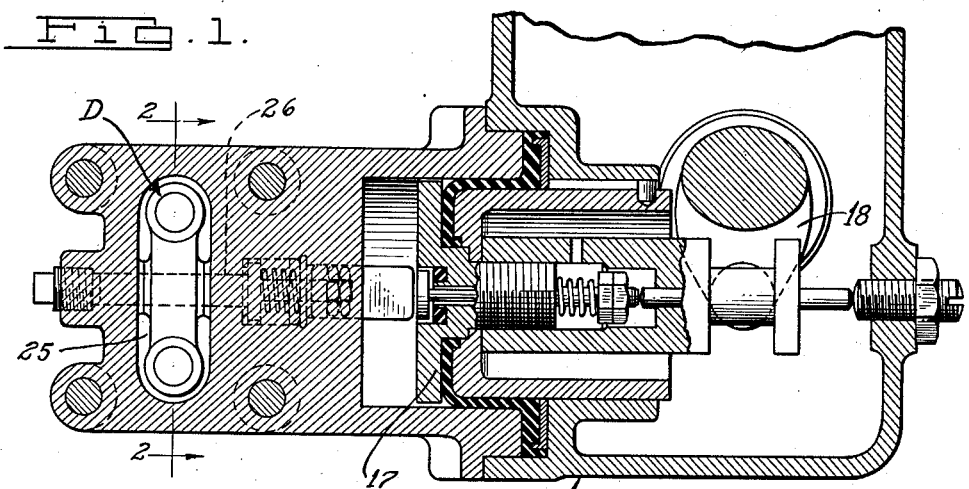
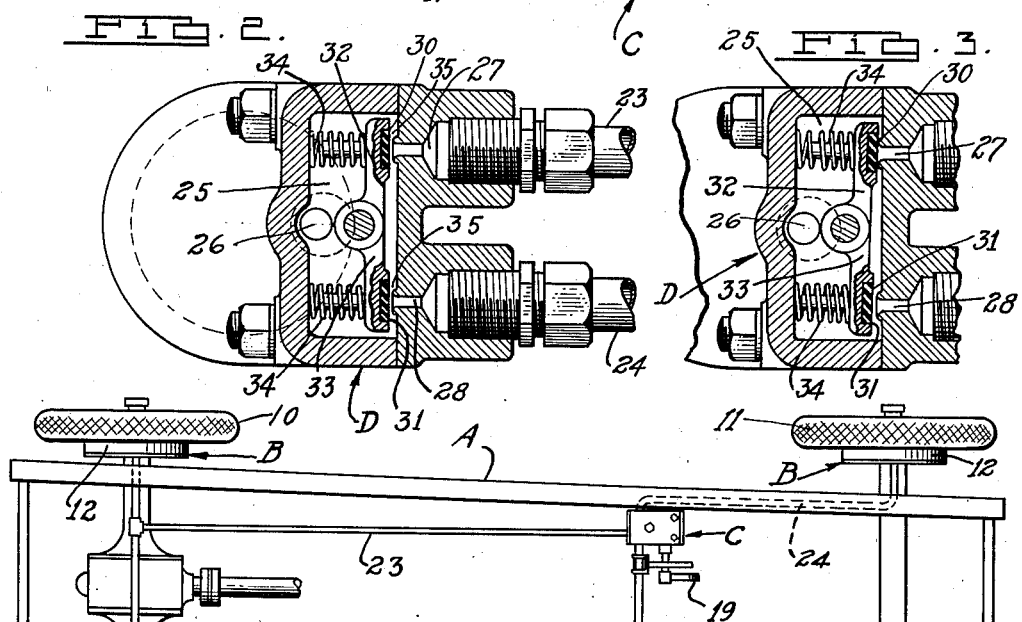
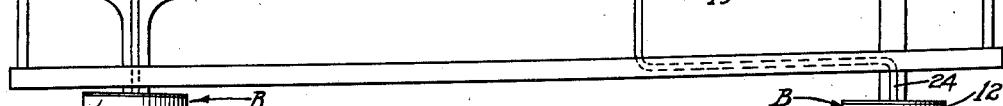
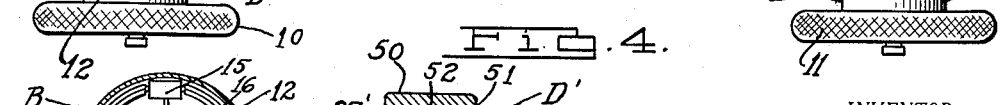
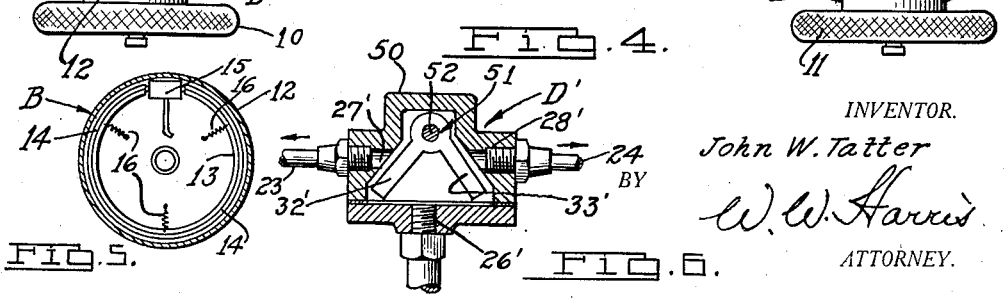
INVENTOR.
John W. Tatter
BY
W. W. Harris
ATTORNEY.

Patented Dec. 3, 1935

2,022,794

UNITED STATES PATENT OFFICE 2,022,794

BRAKE

John W. Tatter, Detroit, Mich., assignor, by mesne assignments, to Bendix Products Corporation, South Bend, Ind., a corporation of Indiana Application August 13, 1930, Serial No. 474,892

9 Claims. (Cl. 303—84)

This invention relates to brakes and refers more particularly to fluid brake systems such as are used for motor vehicles. One difficulty experienced with such systems lies in the failure of the brake systems where a hose, coupling, or pipe line breaks or where fluid leakage otherwise occurs at some point in the system. It is customary at the present time to provide brake devices for the front and rear wheels of the vehicle and on failure of the fluid conducting apparatus to any of the brake devices the whole system ordinarily fails.

It is an object of this invention to provide means in the nature of a safety device which will automatically seal or close off that portion of the system which might fail through the occurrence of a fluid leak, thereby retaining the remaining portion of the system for braking the vehicle. Thus for example in a four wheel brake system my device may be arranged to automatically close off the fluid conducting pipes for either the front or rear brakes, leaving the remaining front or rear brakes free for normal operation without leakage of fluid from the defective portion of the system. Such an arrangement tends for safety and enables a driver to operate the vehicle satisfactorily until repairs can be conveniently made to the brake system which has developed leakage.

Further objects of this invention reside in the provision of a safety device which shall be simple in construction and operation and capable of manufacture and assembly at relatively low cost.

Still further features of the invention reside in the novel combination and arrangement of parts more particularly hereinafter described and claimed.

Referring to the accompanying drawing which illustrates one embodiment of this invention and in which like reference characters indicate corresponding parts:

Fig. 1 is a longitudinal sectional view of a master cylinder of a fluid brake system and showing my improved safety device associated therewith, Fig. 2 is a detail sectional view taken on the line 2—2 of Fig. 1 and illustrating the safety device in normal operating position, Fig. 3 is a detail sectional view similar to Fig. 2, but showing the port to one of the fluid lines closed, Fig. 4 is a diagrammatic plan view of a vehicle chassis provided with my fluid brake system, Fig. 5 is a diagrammatic view of one of the wheel braking devices, and Fig. 6 is a sectional detail view of a safety device of modified construction.

In the drawing reference character A illustrates a vehicle chassis having rear wheels 10 and front wheels 11, each wheel having associated therewith a brake device B. As generally customary each brake device B may comprise a brake drum 12 engageable by a shoe 13 carrying friction material 14 and adapted to be moved into frictional engagement with the drum by a fluid cylinder and piston assembly 15, springs 16 returning the shoe to its inoperative position on release of the fluid pressure. The details of the brake devices B form no part of this invention.

In order to actuate the brake devices B, I may provide a pressure controlling or master cylinder C having a piston 17 reciprocated by means of the pivoted cam or crank 18 which is operatively connected with the usual foot peddle 19. The fluid in the brake system is placed under pressure by the piston 17, the fluid pressure being transmitted through pipes or tubes 23 and 24, respectively communicating with the cylinders 15 of the rear and front wheel brake devices B.

At some convenient point in the system, preferably intermediate the master cylinder C and conduits 23 and 24, I provide my safety device D. In the illustrated embodiment this safety device comprises a compartment or valve chamber 25 communicating with the cylinder C by the passage 26. The valve chamber is provided with a pair of outlet passages 27 and 28 respectively connected with the fluid conduits 23 and 24 in any suitable manner.

In the normal position of the device as illustrated in Fig. 2, the fluid is free to pass from the master cylinder C to the fluid conduits 23 and 24 through the passages 27 and 28. The flow of fluid to the outlet passages is controlled by means of a pivoted valve structure 29 provided with a pair of valves 30 and 31 carried respectively by the arms 32 and 33 of the valve structure. A pair of springs 34 are provided, each spring bearing on one of the arms of the valve structure, said springs being so constructed as to apply equal pressures on the arms. The valve structure is thus very delicately balanced and any differential in pressures in the brake system will unbalance the valve structure. The valves 30 and 31 preferably provide a relatively small fluid clearance 35 with their respective valve seats, whereby the valve will have a relatively small travel in selectively engaging the valve seats.

In operation with the parts as shown in Fig. 2, it will be noted that the valve member is balanced, whereby normally on movement of the piston 17 fluid pressure will be transmitted past the valves and through passages 27 and 28 because of the clearance 35 and thence through conduits 23 and 24 for actuating the brake device B of the rear and front wheels. However, should one of the conduits 23, 24 break or other failure occur to produce a leakage in the system, then my safety device comes into operation, and closes off the defective portion of the system. Thus when such a leakage develops, a pressure differential is produced on the valves sufficient to move the valve structure so that the outlet passage associated with the defective portion of the system is closed. It is customary in fluid brake systems to maintain the fluid under a small initial pressure such as 10 to 20 pounds per square inch which I have found is sufficient to actuate the valve on occurrence of a leakage.

Where the system is not under an initial pressure and as an addition to the initial pressure system, the valve structure is moved upon development of a leakage in the system, since when the operator actuates the piston 17, the majority of the fluid will tend to flow past that valve and associated passage which leads to the faulty portion of the brake system. This abnormal flow of fluid together with the aforesaid pressure differential will induce movement of the valve in the direcion of the abnormal fluid flow serving to quickly engage the valve and its seat, thus cutting off further passage of fluid from the master cylinder C in the direction of the faulty portion of the system, the other portion being entirely free to operate normally. Movement of the valve in response to a small pressure differential and resulting abnormal fluid flow such as described is sufficiently quick to accomplish the objects at hand entirely satisfactory. Once seated the valve device tends to remain in the position shown in Fig. 3, thus maintaining operation of at least a very effective portion of the brakes until repairs can be made.

Preferably the valves comprise discs or inserts 40 of rubber or other material to insure a tight fit between the valve and valve seat.

A modified construction as shown in Fig. 6 illustrates a safety device D' comprising a casing 50 provided with a fluid inlet 26' and fluid outlets 27' and 28'. A valve structure 51 is pivotally mounted on a shaft 52 and comprises the angularly spaced arms 32' and 33'. A relatively slight clearance is provided intermediate the valves and their seats and under normal conditions the valve is positioned as shown permitting the fluid to flow into both branches of the brake system, represented by the fluid conduits 23' and 24'. A brake in the system or other failure produces the same result as described above causing the valve structure to selectively close one or the other of the outlet ports 27' and 28'.

I do not limit my invention to the particular details described and illustrated as other embodiments within the spirit of my invention will be apparent from my disclosure.

What I claim as my invention is:

1. In a fluid brake safety device, the combination of a housing provided with a plurality of outlet passages and a pivotally mounted member having a pair of arms extending parallel with one another, each of said arms having a valve seating portion mounted thereon to pivotally move therewith, said pivotally mounted member being automatically actuated in its pivotal movement to permit one of its valve closing portions to close one of said outlet passages when leakage of fluid occurs in one of the outlet passages of said housing.

2. In a fluid brake safety device, the combination of a housing provided with a plurality of fluid pressure transmitting means, a pivotally mounted element in said housing, said pivotally mounted element having a pair of arms, each of the arms of said pivotally mounted element being provided with a valve adapted for selective engagement with one of said fluid pressure transmitting means, and means engaging each of said arms to balance said pivotally mounted element when said valves are in their open positions.

3. In a safety device for a fluid brake system, a pivotally mounted member having a pair of arms each provided with a valve member, said pivotally mounted member being responsive to failure of fluid pressure transmitting means for controlling the application of fluid pressure, each of the arms of said pivotally mounted member being resiliently balanced when their valve members are in open positions.

4. In a safety device for a fluid brake system, the combination of a housing having an inlet together with a pair of outlet passages, a valve member having a pair of arms, said valve member being pivotally mounted between its arms, a deformable valve seat member suitably mounted in each of the arms of said valve member, and resilient members suitably mounted between each of the arms of said pivotally mounted member and said housing.

5. In a safety brake device for a fluid pressure brake, the combination of a housing provided with a pair of parallel passages connected therewith, a valve member normally extending at right angles to and adjacent both of said pair of parallel passages, and means for balancing said valve member in its normal position, said means permitting said valve member to close one of said passages in response to loss of pressure in one of the parallel passages of said housing.

6. In a safety brake device for a fluid brake system, the combination of a pivotally mounted valve member adapted to pivotally move to a position for closing a portion of the fluid brake system to the passage of fluid therethrough in response to loss of pressure in a portion of the fluid brake system, and a pair of resilient members for balancing said pivotally mounted valve member in a normal position to permit the passage of fluid through the fluid brake system, said pair of resilient members being located in different parallel planes, each of said resilient members exerting a thrust in the same direction against said valve member.

7. In a safety brake device for a fluid brake system, the combination of a housing provided with a pair of valve seat portions, said pair of valve seat portions extending substantially in a common plane, a valve member movably mounted adjacent each of said pair of valve seat portions, said valve member having surfaces for contacting the valve seat portions of said housing, said surfaces of said valve member extending substantially in a common plane, and means for exerting a balancing pressure on said valve member to maintain a relatively small fluid clearance space between said valve seat portions and the surfaces of said valve member for contacting said valve seat portions of said housing, said relatively small fluid clearance being approximately equal between each of said valve seat portions and said surfaces of said valve member.

8. In a safety brake device for a fluid brake system, the combination of a housing having a wall portion extending in a single plane, the wall portion being provided with a pair of passages therethrough, each of said passages being provided with a valve seat portion at one of its ends, and a valve member movably mounted in said housing, said valve member having arm portions extending substantially parallel with said wall portion of said housing, each of the arm portions of said valve member being provided with surfaces for contacting one of the valve seat portions of the passages of said housing in response to loss of fluid pressure in the fluid brake system.

9. In a safety brake device for a fluid brake system, the combination of a housing having a fluid chamber, an inlet passage connecting with the fluid chamber of said housing, a pair of outlet passages connecting with the fluid chamber of said housing, a pair of outlet passages connecting with the fluid chamber of said housing, said pair of outlet passages being both located in a single side wall of the fluid chamber of said housing, a valve member pivotally mounted in the fluid chamber of said housing, said valve member having its pivot point located between the inlet passage and the single side wall of said housing, said valve member being actuated, in response to loss of fluid pressure in the fluid brake system, to close one of said outlet passages of said housing.

JOHN W. TATTER.